United States Patent [19]
Shreve

[11] 3,782,507
[45] Jan. 1, 1974

[54] BRAKE ACTUATED MECHANISM

[76] Inventor: Russell L. Shreve, 88 Linda, Troy, Mich. 48084

[22] Filed: Mar. 29, 1971

[21] Appl. No.: 129,053

[52] U.S. Cl. .................................. 188/2 D, 188/24
[51] Int. Cl. ............................ B62l 3/02, F16c 1/14
[58] Field of Search ............................ 188/2 D, 24

[56] References Cited
UNITED STATES PATENTS
1,674,751   6/1928   Von Luettwitz ................... 188/2 D
1,910,527   5/1933   Dormoy .............................. 188/2 D
FOREIGN PATENTS OR APPLICATIONS
268,439   0/1927   Great Britain ..................... 188/2 D Primary Examiner—Duane A. Reger
Attorney—Harness, Dickey & Pierce

[57] ABSTRACT

A brake actuating mechanism for two wheel vehicles such as motorcycles, motor bikes or the like having front and rear wheel brakes, the mechanism being operable to sequentially operate the front and rear brakes upon actuation of the vehicle brake pedal by the operator, whereby the rear wheel brake is applied prior to the front wheel brakes so as to prevent excessive front wheel braking relative to rear wheel braking, whereby instability and possible loss of vehicle control are minimized.

2 Claims, 6 Drawing Figures

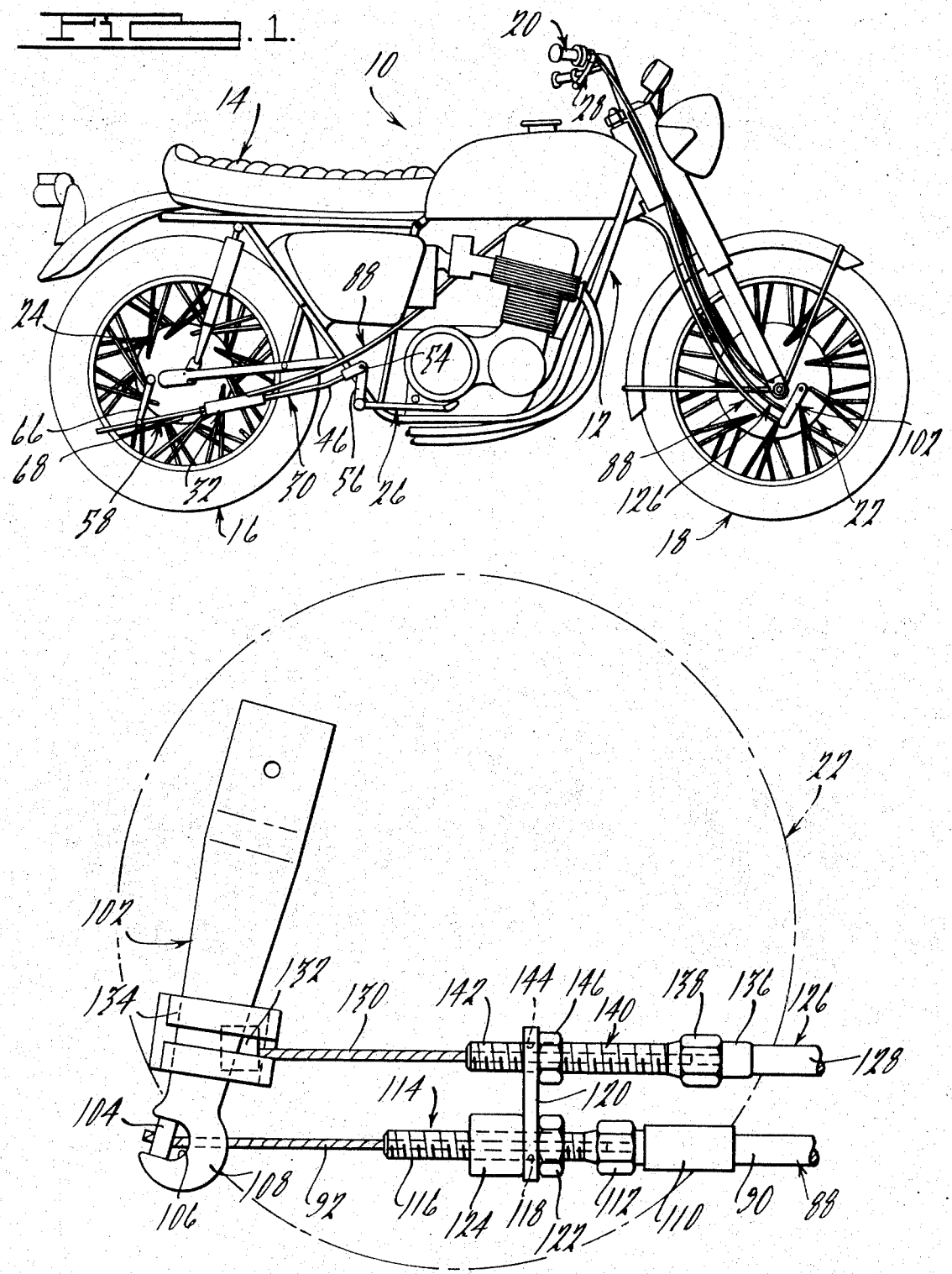

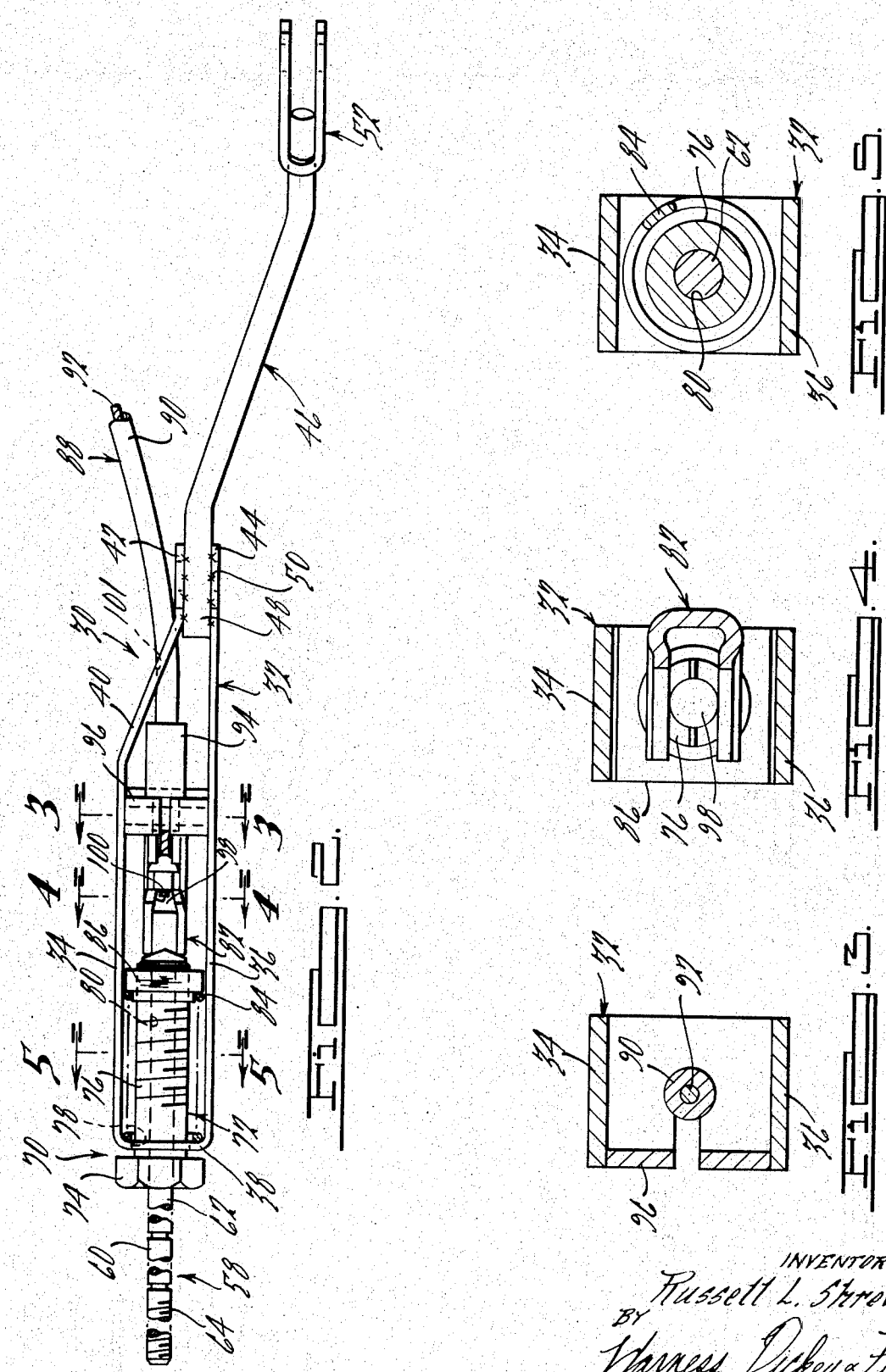

BRAKE ACTUATED MECHANISM

BACKGROUND OF THE INVENTION

One problem with a two wheel vehicle, such as a motorcycle or the like appears to be in the sensitivity of the vehicle to excessive braking of the front wheel relative to the rear wheel. If the front wheel brake is applied too rapidly relative to the rear wheel brake, the vehicle becomes unstable and may be unable to be controlled by the vehicle operator. Such two wheel vehicles are typically provided with a foot operated rear brake and a hand operated front brake. In many cases because of the undesirable sensitivity of the vehicle to overbraking at the front wheel, the vehicle operator will use the hand operated control minimally, if at all; this, of course, prevents instability but results in increased stopping distance since the front wheel brakes are not being effectively used.

The present invention is directed toward a novel brake actuating mechanism for motorcycles, motor bikes and related vehicles that is intended to overcome the aforesaid problems by proportioning the application of front wheel and rear wheel braking such that the front wheel brake is not actuated excessively relative to the rear wheel brake. More particularly, the present invention is directed toward a novel brake actuating mechanism which, upon application of a single operator controlled device, is adapted to sequentially apply first the rear wheel brake and thereafter the front wheel brake of the vehicle, whereby the problem of excessive front wheel braking is minimized.

SUMMARY OF THE INVENTION

This invention relates generally to brake systems for two wheel vehicles, such as motorcycles, motor bikes or the like, and more particularly, to a brake actuating mechanism for selectively actuating the front and rear brakes of such a vehicle so as to prevent excessive front wheel braking relative to rear wheel braking.

It is accordingly a general object of the present invention to provide a novel brake actuating mechanism of the above described character.

It is a more particular object of the present invention to provide a novel brake actuating mechanism, as described above, which may be conveniently applied to existing motorcycle, motor bike, etc. brake systems.

It is another object of the present invention to provide a novel brake actuating mechanism of the above described type which is of an extremely simple design and is economical to manufacture.

It is still another object of the present invention to provide a novel brake actuating mechanism for two wheel vehicles which automatically sequentially actuates or applies the front and rear brakes of the vehicle upon actuation, for example, of a foot operated brake pedal, and which also permits independent actuation of the front wheel brake, for example, by actuation of a conventional hand brake lever on the vehicle handle bar.

It is another general object of the invention to provide a new and improved brake actuating mechanism for a motorcycle.

Other objects, features and advantages of the present invention will become apparent from the following detailed description taken in conjunction with the accompanying drawings.

BRIEF DESCRIPTION OF THE DRAWINGS

FIG. 1 is a side elevational view of a conventional motorcycle having the brake actuating mechanism of the present invention operatively associated therewith;

FIG. 2 is an enlarged side elevational view of the brake actuating mechanism of the present invention;

FIG. 3 is a transverse cross-sectional view taken substantially along the line 3—3 of FIG. 2;

FIG. 4 is a transverse cross-sectional view taken substantially along the line 4—4 of FIG. 2;

FIG. 5 is a transverse cross-sectional view taken substantially along the line 5—5 of FIG. 2, and FIG. 6 is an enlarged fragmentary side elevational view of the front wheel brake actuating mechanism of the vehicle illustrated in FIG. 1.

DETAILED DESCRIPTION OF A PREFERRED EMBODIMENT

Referring now to the details of the drawings, a conventional two wheel vehicle, such as a motorcycle, motor bike or the like 10, is shown generally as comprising a frame structure 12 having an operator supporting seat 14. The frame 12 is provided with a driven rear wheel 16 and with a front wheel 18 which is steerable by means of a conventional handle bar 20. The vehicle 10 is provided with a front brake 22 and a rear brake 24, the latter of which is conventionally actuatable by means of a foot operated brake pedal 26 and the former of which is operable by means of the pedal 26 and/or a hand brake lever 28 mounted on the handle bar 20.

In accordance with the principles of the present invention, the vehicle 10 is provided with a brake actuating mechanism, generally designated by the numeral 30, which, as best seen in FIG. 2, comprises an elongated body or housing 32 having spaced parallel side sections 34 and 36 which are connected at one end by means of a transversely extending end section 38. The end of the side section 34 opposite the section 38 is provided with an inwardly converging section 40 which terminates at the outer end thereof in an end portion 42 which is arranged in close proximate relation with respect to a parallel arranged end portion 44 on side section 36.

The end of the housing 32 at which the end portions 42, 44 are located is adapted to be operatively secured to the foot operated brake pedal 26 by means of an elongated connecting rod 46 having a rearwardly projecting end portion 48 adapted to be fixedly secured, as by welding or the like 50, interjacent the end portions 42, 44 of the housing 32. The opposite or forward end of the connecting rod 46 is provided with a generally bifurcated clevis bracket 52 which is adapted to be pivotably secured by means of a suitable pivot pin or the like 54 to an upwardly and rearwardly extending brake pedal actuating arm 56. As will be appreciated by those skilled in the art, upon actuation of the foot pedal 26, the actuating arm 56 will be pivoted in a generally clockwise direction in the drawing, whereby the connecting rod 46 and entire housing 32 will be moved longitudinally forwardly, for purposes later to be described.

The end of the housing 32 opposite the connecting rod 46 is adapted to be operatively connected to the rear brake 24 of the vehicle 10 by means of an elongated connecting rod representatively designated by the numeral 58. As illustrated, the connecting rod 58 comprises an elongated intermediate section 60, a forward end section 62 and an externally threaded rearward end section 64, the latter of which is adapted to be fixedly secured to a rear brake lever 66 by means of a suitable connecting bracket, or the like 68. As is well known in the art, pivotal movement of the lever 66 in a generally counterclockwise direction in FIG. 1 will result in application of the rear brake 24, with the result that a suitable forwardly directed force exerted upon the connecting rod 58 will cause actuation of the rear brake 24, as will later be described.

The forward end section 62 of the connecting rod 58 is adapted to be operatively connected to the housing 32 by means of a spring assembly, generally designated by the numeral 70. The assembly 70 comprises an elongated bolt-like element 72 which comprises a head section 74 of generally hexagonal cross-section, and an elongated, generally cylindrically shaped externally threaded shank section 76 which is adapted to extend longitudinally through a suitable aperture 78 formed in an end section 38 of the housing 32. The element 72 is provided with a longitudinally extending central bore 80 through which the forward end section 62 of the connecting rod 58 extends. As illustrated in FIG. 2, the forward end of the connecting rod section 62 terminates interiorly of the housing 32 and is provided with a generally bifurcated connecting bracket 82, the purpose of which will hereinafter be described. An elongated helical compression spring 84 is mounted coaxially of the shank section 76 of the element 72, with one end of the spring 84 abutting against the end section 38 and the opposite end of the spring 84 abutting against an adjustment member 86 which is threadably received upon the shank section 76 of the element 72.

It will be seen from the foregoing that as the connecting rod 46 and housing 32 move forwardly of the vehicle 10 upon actuation of the brake pedal 26, the coil spring 84 will be compressed between the end section 38 and threaded adjustment member 86. Depending upon the preload of the spring 84, forward movement of the housing 32 will cause corresponding forward movement of the connecting rod 58, which will in turn cause actuation of the rear brake 24. The member 86, of course, may be longitudinally adjusted along the shank section 76 of the element 72 to control the amount of preload or bias provided by the spring 84.

The brake actuating mechanism 30 is adapted to be operatively connected to the front wheel brake 22 b-y means of a conventional control cable assembly 88 which is of the push-pull type and includes an external hollow cylindrical housing 90 and an internal longitudinally slidable cable member 92. The cable assembly 88 extends longitudinally of the vehicle 10 between the mechanism 30 and the front wheel brake 22, with the rearward end of the housing 90 being provided with an end fitting 94 adapted to engage a generally transversely disposed bracket 96 which extends between and is fixedly secured to the inner sides of the side sections 34, 36 of the housing 32, whereby the cable housing 90 is secured against relative longitudinal movement with respect to the housing 32. The rearward end of the cable member 92 extends rearwardly beyond the terminal end of the housing 90 and projects through the mounting bracket 96 to a position interjacent the bracket 96 and the adjustment member 86, as best seen in FIG. 2. The aforesaid end of the cable member 92 is provided with a fixedly secured generally frustoconical connecting element 98 which is adapted to be nestingly received within a central recessed portion 100 of the bifurcated connecting bracket 82, with the result that relative longitudinal movement of the connecting rod 58 with respect to the housing 32 will cause a corresponding longitudinal movement of the cable member 92 with respect to the cable housing 90 of the assembly 88, as will later be described.

The control cable assembly 88 extends forwardly of the housing 32 through a suitable opening 101 formed in the section 40 thereof, and the forward end of the assembly 88 is adapted to be operatively secured to a front brake actuating lever best illustrated in FIG. 6 and generally designated by the numeral 102. As will be apparent to those skilled in the art, the actuating lever 102 is pivotably mounted on the brake 22 and the lower end thereof is adapted to be pivoted rearwardly or in a counterclockwise direction in FIG. 6 in order to effect application of the front brake 22. Toward this end, the forward terminal end of the cable member 92 is provided with an integral connecting element 104 which is adapted to be nestingly received within a suitable recessed portion 106 formed in a bifurcated lower end portion 108 on the actuating lever 102. The cable housing 90 is provided with a suitable end fitting 110 which is adapted to be fixedly secured to an enlarged diameter head portion 112 of an elongated tubular shaped attachment member 114. The member 114 has an externally threaded shank portion 116 which extends through a suitable bore 118 in a mounting bracket 120 secured to the front wheel brake 22, suitable threaded adjustment members 122 and 124 being threadably received upon the shank portion 116 on the opposite sides of the bracket 120 for longitudinally adjustably securing the member 114 thereto. As will be appreciated by those skilled in the art, upon rearward movement of the cable member 92 through operation of the brake actuating mechanism 30 hereinafter to be described, the actuating lever 102 will be pivoted in a counterclockwise direction in FIG. 6 to effect application of the front wheel brakes 22.

Together with being actuatable by the brake cable assembly 88, the brake actuating lever 102 may also be independently actuated by means of the hand lever 28 mounted upon the handle bar 20 of the vehicle 10. Toward this end, the vehicle 10 is provided with a second brake actuating cable assembly illustrated best in FIG. 6 and generally designated by the numeral 126. The assembly 126 comprises a housing 128 which is similar to the aforedescribed housing 90 and has an elongated push-pull or longitudinally slidable cable member 130 extending therethrough and connected at the upper end thereof to the hand lever 28. The lower terminal end of the cable member 130 is provided with an integral connecting element 132 which is adapted to be received within a clevis like connecting bracket 134 that is secured to the brake actuating lever 102. The lower terminal end of the housing 128 is provided with an end fitting 136 which is secured within an enlarged diameter section 138 of an elongated generally tubular shaped attachment member 140 which is similar in construction to the member 114 and comprises an externally threaded shank portion 142. As illustrated in FIG. 6, the shank portion 142 is adapted to extend through a suitable aperture 144 in the mounting bracket 120 and be adjustably secured thereto by means of a suitable adjustment member 146 which is threadably received upon the shank portion 142.

Referring now to the overall operation of the brake actuating mechanism 30 of the present invention, at such time as the operator of the vehicle 10 is desirous of applying the vehicle brakes, the foot operated brake pedal 26 may be actuated, whereby to cause clockwise pivotal movement of the actuating arm 56. Such pivotal movement of the arm 56 in turn causes longitudinal forward movement of the connecting rod 46 and simultaneous forward movement of the entire housing 32. As the housing 32 moves forward, the connecting rod 58 will also move forwardly to effect counterclockwise pivotal movement of the rear brake lever 66 and thus application of the rear wheel brake 24. As the housing 32 continues to move forwardly however, under the influence of the forward movement of the connecting rod 46; the preload force applied by the spring 84 between the housing 32 and rod 58 will be overcome and the spring 84 will subsequently undergo additional compression at a rate depending upon the spring rate thereof, and the magnitude of the preload or bias placed thereon by the adjustment member 86. The result is that relative movement will then occur between the housing 32 and the connecting rod 58, whereby the cable member 92 will be moved longitudinally rearwardly relative to the housing 90 by virtue of its connection via the connecting bracket 82 to the forward end of the connecting rod 58. Such relative movement of the cable member 92 will cause the front brake actuating lever 102 to be pivoted in a counterclockwise direction in FIG. 6, resulting in application of the front wheel brake 22. It will thus be seen that the front wheel brake 22 will be applied after some predetermined load or force has been applied by the rear brake 24 upon actuation of the brake pedal 26 by the operator so as to minimize the possibility of excessive front wheel brake application relative to rear wheel brake application. The load or force at which the front wheel brake is actuated will be determined by the spring rate and the preload on the spring 84. These parameters, of course, can be modified to suit different braking requirements for different vehicles. Thus, the mechanism 30 provides a means whereby, in a sense, the rate of application of the front brake relative to that of the rear brake can be selectively controlled to provide for a desired proportion of front brake to rear brake application so that overbraking of the front brake is effectively prevented. Rate here is considered as the degree of brake application relative to input force or load applied by the vehicle operator. It will be appreciated, of course, that by virtue of the independent operative connection between the front brake actuating lever 102 and the hand lever 28 on the handle bar 20, when desired, the front brake 22 may still be actuated by the hand lever 28 independent of the brake actuating mechanism 30.

In the front and rear wheel brakes in a conventional motorcycle there will be some resilient means such as a spring which will normally function to return or release the front and rear brakes to their deactuated positions, after the operator has removed the brake actuating force. The characteristics of spring 84 or the hold off or rate characteristics of the device 30 will be selected to operate in conjunction with these front and rear brake resilient means to provide the desired braking effect as noted above.

It will be seen from the foregoing that the present invention provides a novel brake actuating mechanism which is intended to overcome or at least minimize the problems resulting from excessive front wheel brake application. The brake actuating mechanism of the present invention will be seen to be of an extremely simple design and will thus be economical to manufacture and easy to install. Additionally, the brake actuating mechanism of the present invention, by virtue of its extreme simplicity of design, may be used in association with a large number of different types of two wheel vehicles having front and rear wheel brakes, whereby to provide for universality of application.

While it will be apparent that the preferred embodiment illustrated herein is well calculated to fulfill the objects above stated, it will be appreciated that the present invention is susceptible to modification, variation and change without departing from the scope of the invention.

What is claimed is:

1. In a brake actuated mechanism for a two wheeled vehicle having front and rear wheel brakes and operator actuated controls for applying said brakes, said controls including first means operable in response to an actuating force applied by the vehicle operator for actuating both of said wheel brakes and second means including a hand operated lever for actuating one of said brakes, said second means including a push-pull cable assembly comprising a cable housing and a cable member extending between said one wheel brake and said hand operated lever, said lever being operable to actuate said one wheel brake by means of said cable assembly independently of said first means; relatively movable means operatively connected with said wheel brakes and actuable in response to said force applied by the operator for initially applying the other of said wheel brakes, said means including a housing, a first connecting rod secured at one end of said housing and at an opposite end to said first means, a second connecting rod connected at one end to said other brake and at an opposite end to said housing, means including a spring assembly providing for relative movement between said opposite end of said second connecting rod and said housing, said spring assembly including a compression spring compressible between said opposite end of said second connecting rod and said housing; and means responsive to relative movement between said relatively movable means for subsequently actuating said one wheel brake at a predetermined magnitude of said actuating force, said last mentioned means including a second push-pull cable assembly comprising a second cable housing and a longitudinally slidable cable member extending between said housing and said one wheel brake, one end of said cable housing being fixedly secured to said housing and one end of said cable member being secured to said opposite end of said second connecting rod for movement therewith relative to said housing and an opposite end of said one wheel brake whereby said one wheel brake will be applied after application of said other wheel brake.

2. In a brake actuated mechanism for a two wheeled vehicle having front and rear wheel brakes and operator actuated controls for applying said brakes, said controls including first means operable in response to an actuating force applied by the vehicle operator for actuating both of said wheel brakes and second means including a hand operated lever for actuating one of said brakes independently of said first means:

relatively movable means operatively connected with said wheel brakes and actuable in response to said force applied by the operator for initially applying the other of said wheel brakes, said means including a housing, a first connecting rod secured at one end of said housing and at an opposite end to said first means, a second connecting rod connected at one end to said other brake and at an opposite end to said housing, means including a spring assembly providing for relative movement between said opposite end of said second connecting rod and said housing, said spring assembly including a compression spring compressible between said opposite end of said second connecting rod and said housing; and means responsive to relative movement between said relatively movable means for subsequently actuating said one wheel brake at a predetermined magnitude of said actuating force whereby said one wheel brake will be applied after application of said other wheel brake.

* * * * *